United States Patent [19]

Nakazawa et al.

[11] Patent Number: 5,298,234
[45] Date of Patent: Mar. 29, 1994

[54] ALUMINA-SILICA RESIN ADDITIVE

[75] Inventors: Tadahisa Nakazawa, Tokyo; Masahide Ogawa, Shibata; Kiyoshi Abe, Shibata; Kazuhiko Suzuki, Shibata, all of Japan

[73] Assignee: Mizusawa Industrial Chemicals, Ltd., Tokyo, Japan

[21] Appl. No.: 246,018

[22] Filed: Sep. 14, 1988

Related U.S. Application Data

[63] Continuation of Ser. No. 938,843, Dec. 8, 1986, abandoned.

[30] Foreign Application Priority Data

Dec. 12, 1985 [JP] Japan ................... 60-275007
Aug. 29, 1986 [JP] Japan ................... 61-201824

[51] Int. Cl.$^5$ ............................................. C01B 33/34
[52] U.S. Cl. .................................. 423/714; 106/286.5; 106/287.1; 106/287.11; 423/715; 423/716; 501/68; 501/128; 501/153; 501/154
[58] Field of Search ............. 106/286.5, 287.1, 287.17, 106/287.34; 501/68, 128, 153, 154; 423/714, 715, 716

[56] References Cited

U.S. PATENT DOCUMENTS

| | | | |
|---|---|---|---|
| 3,991,005 | 11/1976 | Wallace | 524/79 |
| 4,136,080 | 1/1979 | Berger | 524/188 |
| 4,153,661 | 5/1979 | Ree et al. | 51/295 |
| 4,225,554 | 9/1980 | Kaplan | 264/328.2 |
| 4,409,285 | 10/1983 | Swerdlow | 428/323 |
| 4,546,041 | 10/1985 | Keane et al. | 428/383 |
| 4,594,213 | 6/1986 | Ealer | 524/229 |
| 4,665,138 | 5/1987 | Roling et al. | 526/86 |
| 4,963,337 | 10/1990 | Zones | 423/718 |
| 4,973,461 | 11/1990 | Vaughan | 423/718 |
| 5,166,111 | 11/1992 | Zones et al. | 423/718 |
| 5,183,787 | 2/1993 | Seaborne | 501/144 |
| 5,206,195 | 4/1993 | Ando et al. | 502/60 |

FOREIGN PATENT DOCUMENTS

213031  7/1983  Japan .

Primary Examiner—Mark L. Bell
Assistant Examiner—W. Thompson
Attorney, Agent, or Firm—Sherman and Shalloway

[57] ABSTRACT

Disclosed is an alumina-silica resin additive consisting of amorphous alumina-silica particles in which a definite cubic or spherical shape is retained in primary particles and the particle sizes of both the primary particles and the secondary particles are controlled to very small values. This additive is excellent in dispersibility in a resin, non-blowing property, slip characteristic and anti-blocking property. A product obtained by surface-treating the amorphous alumina-silica particles with a certain amount of an organic lubricant is very valuable as a filler.

9 Claims, 6 Drawing Sheets

ALUMINA-SILICA RESIN ADDITIVE

This is a continuation of application Ser. No. 938,843, filed Dec. 8, 1986, now abandoned.

BACKGROUND OF THE INVENTION

(1) Field of the Invention

The present invention relates to an alumina-silica resin additive. More particularly, the present invention relates to an additive which has a fine particle size and a definite particle shape and which gives good slip characteristic and anti-blocking property to a resin when it is incorporated in the resin, and process for the preparation of this resin additive.

(2) Description of the Prior Art

When shaped resin articles such as films and sheets are kept piled to one another, blocking is readily caused, and from oil, various inorganic additives have been incorporated into resins for imparting a slip characteristic to the resins.

It is known that zeolites are excellent in this property. For example, Japanese Patent Publication No. 16134/77 teaches that if a zeolite powder having an average particle size smaller than 20 microns is added in an amount of 0.01 to 5% by weight to polypropylene, the blocking resistance of a biaxially drawn polypropylene film can be improved. Furthermore, Japanese Patent Application Laid-Open Specification No. 34356/79 teaches that if an aluminosilicate of the zeolite crystal having an ion exchange capacity is incorporated in an amount of 0.01 to 10% by weight into a chlorine-containing polymer, the thermal stability is improved and improvement of the exterior lubricating property is attained as an additional advantage.

As described above, zeolite particles are excellent in a slip characteristic (external lubricating property) and an anti-blocking property to a shaped resin article. However, a zeolite contains considerable amounts of basic components such as sodium, potassium, calcium and magnesium components in the form of an aluminosilicate, and therefore, because of the presence of these basic components, the shaped resin article is colored with the lapse of time. Moreover, since a zeolite has an adsorbing property, especially a water-adsorbing property, blowing is caused when the zeolite is incorporated into a resin.

Japanese Patent Application Laid-Open Specification No. 213031/83 discloses an alumina-silica additive comprising cubic primary particles having an $Al_2O_3SiO_2$ molar ratio of from 1/1.8 to 1/5 and having one side smaller than 5 microns, wherein said particles are X-ray diffractometrically substantially amorphous and a BET specific surface area smaller than 100 $m^2/g$. It also is taught that the alumina-silica cubic particles can be prepared by acid-treating a crystalline zeolite having a cubic particle shape under such conditions that the crystallinity is substantially lost but the particle shape is not marred, and that cubic particles having such a particle size distribution that the content of particles having a size smaller than 10 $\mu$ is at least 98% by weight and particles having a size of 1 to 5 $\mu$ occupy at least 70% by weight of the total particles are preferred.

Various problems which arise when zeolite particles are incorporated into resins are solved by amorphous alumina-silica particles formed by the acid treatment of a zeolite. However, in the use where a thin thickness is required, for example, when this additive is used for a household wrapping material or a base film of a magnetic tape, the particles are too coarse. Accordingly, development of an additive for imparting an excellent slip characteristic and an excellent blocking resistance, which has a fine particle size and an excellent dispersibility in a resin, is desired.

However, if the zeolite to be subjected to the acid treatment is finely divided, the regular cubic shape of primary particles of the zeolite is destroyed during the acid treatment and the primary particles come to have an indeterminate shape. Furthermore, these indeterminate primary particles are agglomerated to form coarse particles.

SUMMARY OF THE INVENTION

It is therefore a primary object or the present invention to provide an amorphous silica-alumina additive in which the above-mentioned defects of the conventional amorphous silica-alumina additive are effectively eliminated, and a process for the preparation of this amorphous silica-alumina additive.

Another object of the present invention is to provide an amorphous silica-alumina resin additive in which a definite shape of primary particles is retained and the sizes of both the primary particles and secondary particles are controlled to small values, and which has an excellent combination of dispersibility in a resin, non-blowing property, slip characteristic and blocking resistance.

Still another object of the present invention is to provide a process in which an amorphous silica-alumina having the above-mentioned characteristics assuredly and easily can be prepared.

A further object of the present invention is to provide an amorphous alumina-silica resin additive suitable for incorporation into a thin film substrate of a household wrapping material or a magnetic tape.

We found that if a synthetic zeolite having a primary particle size smaller than 0.6 $\mu$m is selected and this synthetic zeolite is acid-treated under such a buffer condition that local reduction of the pH value is controlled and under such a condition that the final pH value is not lower than 5 and the acid-treated zeolite is then heat-treated, an amorphous alumina-silica resin additive having novel particle size characteristics and adsorption characteristics described below can be obtained and the foregoing objects can be attained by this resin additive. We have now completed the present invention based on this finding.

More specifically, in accordance with one aspect of the present invention, there is provided an alumina-silica resin additive consisting of amorphous particles having an $Al_2O_3/SiO_2$ molar ratio of from 1/1.8 to 1/5.0, wherein the alumina-silica particles have a definite cubic or spherical primary particle shape and an average primary particle size smaller than 0.6 $\mu$m as determined by the electron microscope method, the alumina-silica particles have such a secondary particle size distribution that the content of particles having a particle size smaller than 1 $\mu$m as determined by the weight precipitation method is at least 50% by weight, said alumina-silica particles have a BET specific surface area smaller than 80 $m^2/g$, and when the alumina-silica particles are heated at 550° C. for 3 hours and then allowed to stand still in an atmosphere maintained at a relative humidity of 75% and a temperature of 25° C. for 24 hours, the water absorption is smaller than 10% by weight.

In accordance with another aspect of the present invention, there is provided a process for the preparation of an alumina-silica resin additive, which comprises preparing an aqueous slurry of a synthetic zeolite consisting of fine cubic particles having an $Al_2O_3/SiO_2$ molar ratio of from 1/1.8 to 1/5.0 and an average primary particle size smaller than 0.6 μm, contacting the aqueous slurry with an acid under such a buffer condition that local reduction of the pH value is avoided and under such a condition that the final pH value is not lower than 5, thereby to effect an acid treatment of the synthetic zeolite, and calcining the acid-treated zeolite at a temperature higher than 300° C.

In the process of the present invention, it is preferred that the acid treatment be carried out in an aqueous medium containing an acid and an alkali metal salt in an amount of at least 1.0 mole% based on the acid.

DETAILED DESCRIPTION OF THE PREFERRED EMBODIMENTS

The present invention will now be described in detail.

The present invention is characterized in that a synthetic zeolite having a primary particle size smaller than 0.6 μm is selected and this synthetic zeolite is acid-treated under such a buffer condition that local reduction of the pH value is controlled and under such a condition that the final pH value is not lower than 5.

As the result of our research, it was found that in the acid treatment of a synthetic zeolite, the particle shape or secondary particle size of the obtained amorphous particles is greatly influenced by the particles of the starting zeolite particles. For example, in the case where zeolite particles having a primary particle size larger than 0.8 μm are acid-treated, amorphous alumina-silica particles substantially retaining the cubic shape of the starting zeolite particles are formed irrespectively of the acid treatment conditions. However, if a zeolite having a primary particle size smaller than 0.6 μm is acid-treated, the cubic shape of the zeolite particles is frequently lost and indeterminate amorphous alumina-silica particles are produced.

Generally, in case of a powder of an inorganic compound, especially a powder of an amorphous substance, the finer is the primary particle size, the more conspicuous is the tendency of secondary agglomeration and the larger becomes the secondary particle size.

The present invention is based on the novel finding that even in case of fine synthetic zeolite particles having an average primary particle size smaller than 0.6 μm, if the acid treatment is carried out under the above-mentioned conditions, the inherent primary particle shape of the zeolite particles is completely retained in the formed amorphous particles and a fine primary particle size and a fine secondary particle size distribution can be obtained. The buffer condition referred to in the present invention means a condition controlling reduction of the pH value in the acid treatment system, and for example, this condition can be attained by making a buffering agent present in the acid treatment system. Another prominent characteristic feature of the present invention is that it is possible to render a zeolite amorphous by the acid treatment at a final pH value of at least 5. It is believed that one reason why the zeolite can be rendered amorphous under such mild acid treatment conditions is that the primary particle size of the starting zeolite is fine. Under ordinary acid treatment conditions, that is, under such conditions that local reduction of the pH value is caused or the final pH value is lower than 5, the definite primary particle shape is lost and the particles are made indeterminate, and secondary agglomeration becomes conspicuous and the dispersed particle size is increased.

Figure 1:
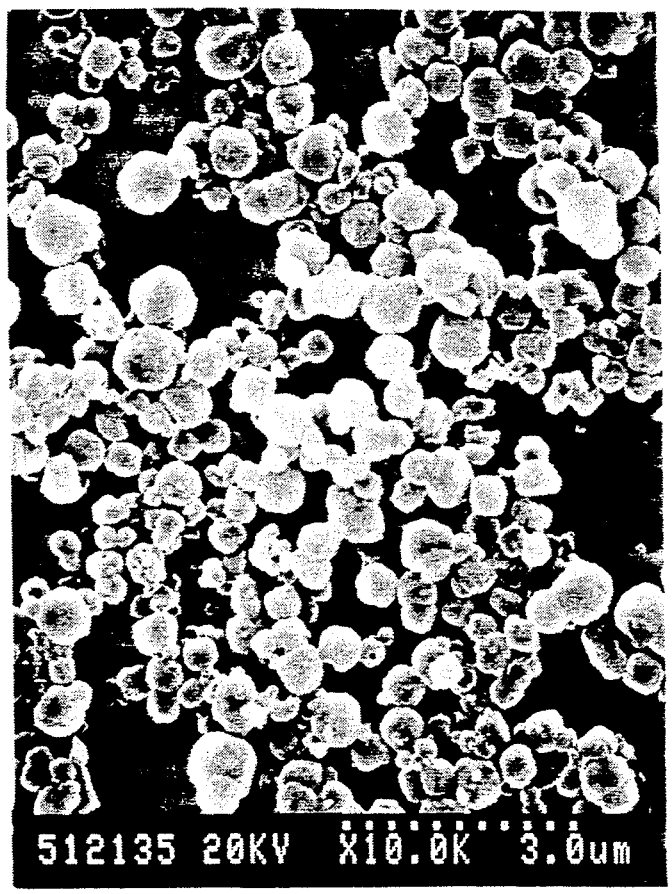
FIG. 1 is an electron microscope photograph showing the particulate structure of the alumina-silica additive of the present invention.
Figure 2:
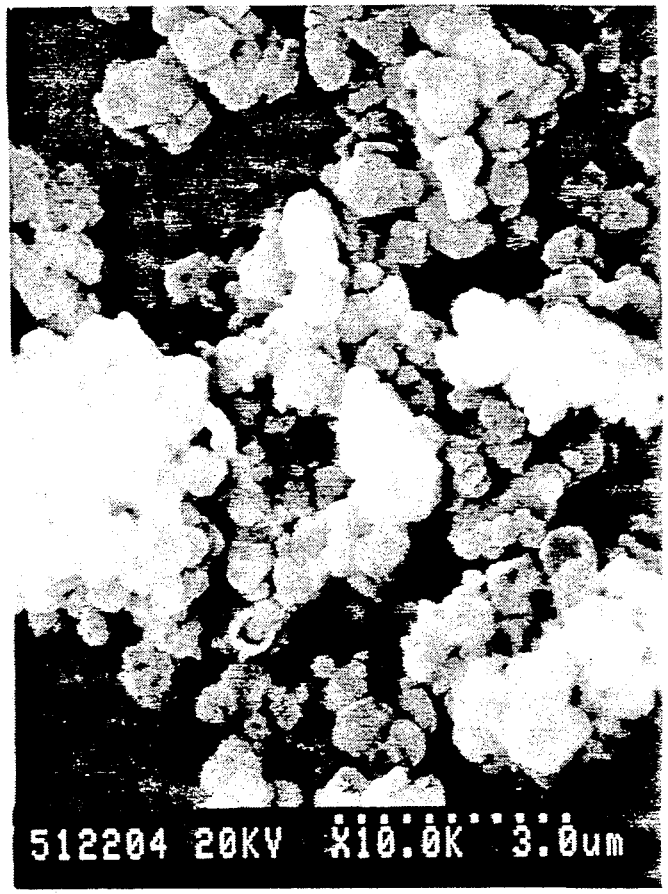
FIG. 2 is an electron microscope photograph showing the particulate structure or alumina-silica particles outside the scope of the present invention.

FIG. 1 of the accompanying drawings is an electron microscope photograph showing the particulate structure of the alumina-silica additive of the present invention, and FIG. 2 is an electron microscope photograph showing the particulate structure of alumina-silica particles outside the scope of the present invention (prepared according to the process shown in Comparative Example 1-(2) given hereinafter). From these photographs, it is understood that the alumina-silica particles of the present invention are surprisingly characterized in that even though the average primary particle size is smaller than 0.6 μm, especially 0.2 to 0.5 μm, the cubic or spherical shape of the primary particles is definitely retained and the degree of secondary agglomeration is conspicuously low.

Figure 3:
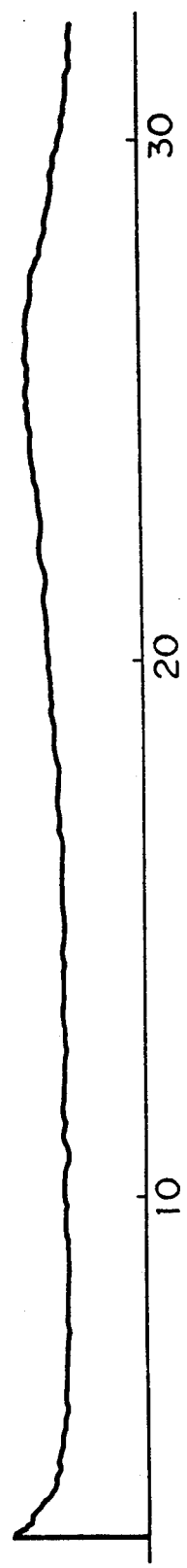
FIG. 3 is an X-ray diffraction diagram of the alumina-silica particles shown in FIG. 1.
Figure 4:
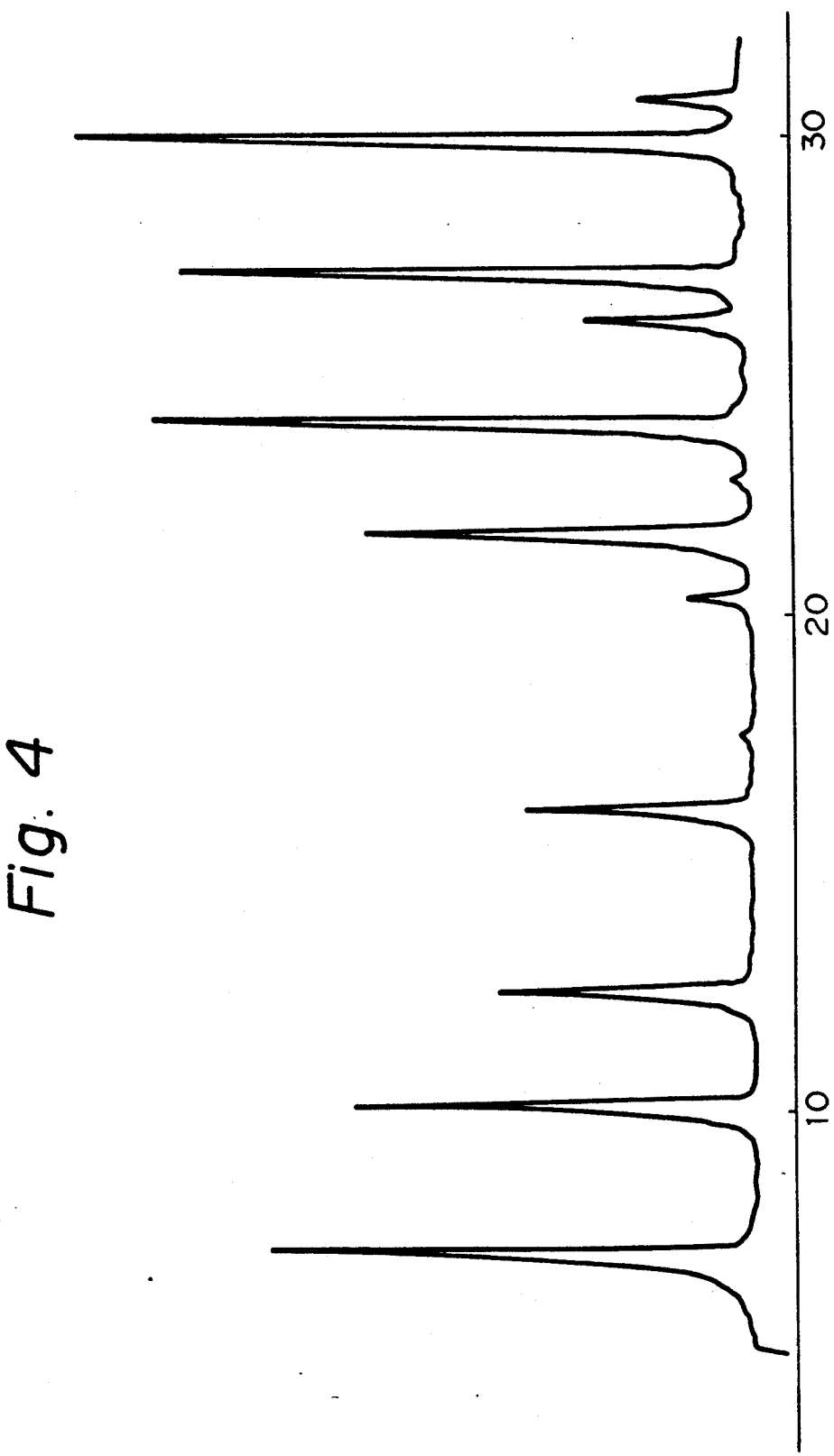
FIG. 4 is an X-ray diffraction diagram of zeolite A used as the starting material for the production of the particles shown in FIG. 3.

FIG. 3 is an X-ray diffraction diagram or the alumina-silica particles shown in FIG. 1, and FIG. 4 is an X-ray diffraction diagram of the synthetic zeolite used as the starting material. From these FIGS. 3 and 4, it is understood that the alumina-silica particles of the present invention are completely amorphous and they have the above-mentioned particulate structure and particle size characteristics even though they are amorphous.

Figure 5:
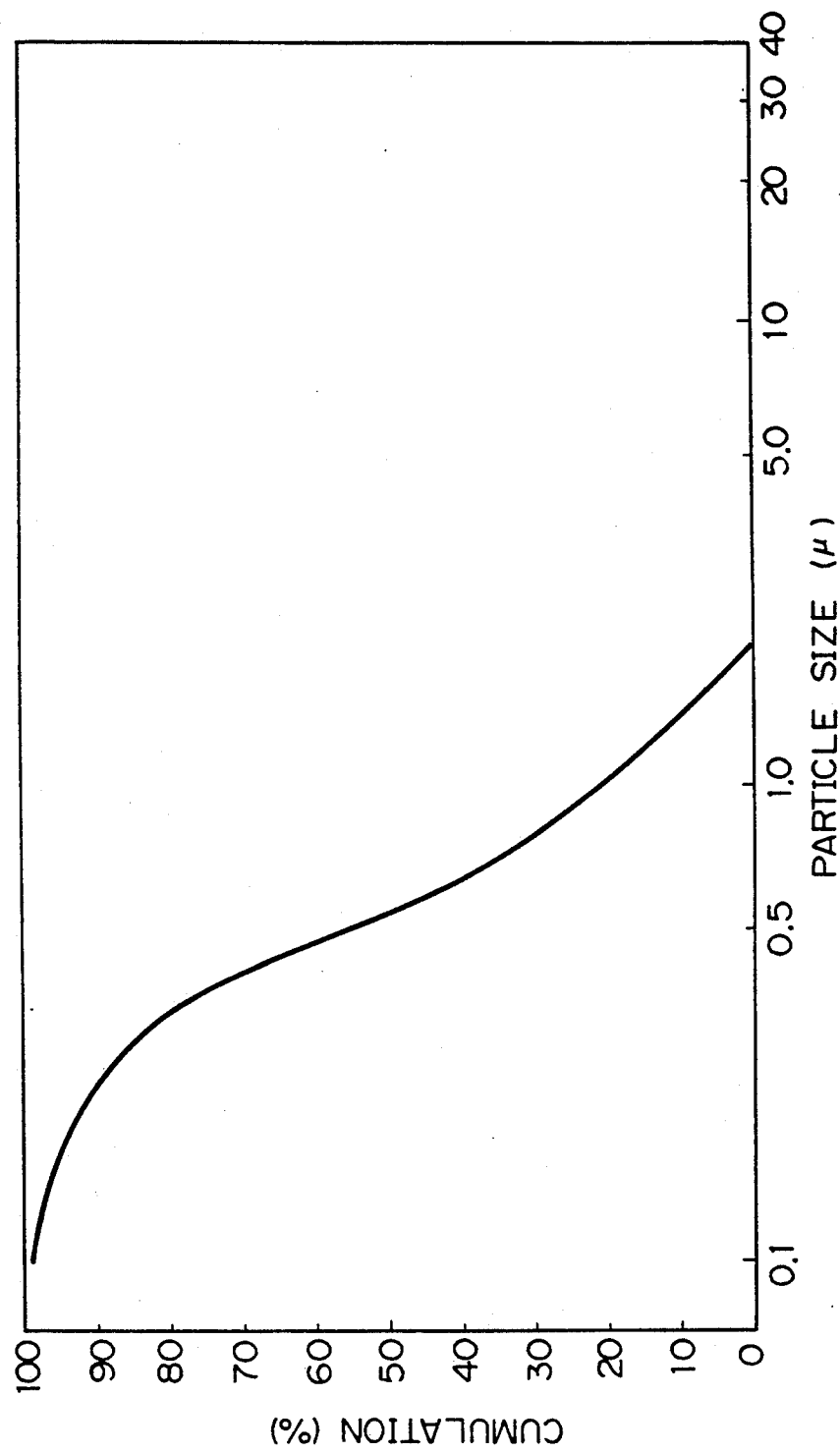
FIG. 5 is a particle size distribution curve of the alumina-silica particles shown in FIG. 1.
Figure 6:
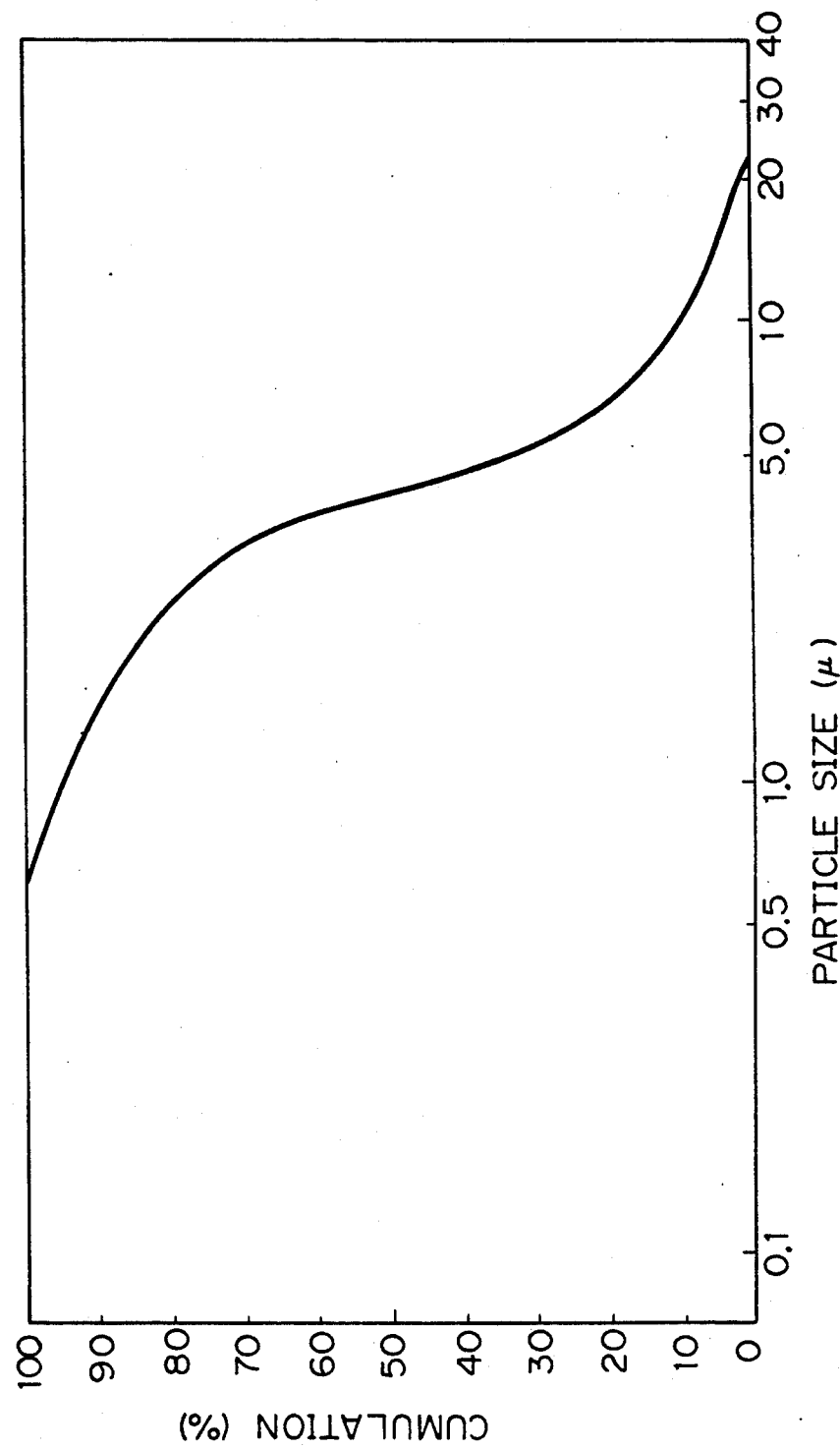
FIG. 6 is a particle size distribution curve of the alumina-silica particles shown in FIG. 2.

FIG. 5 is a particle size distribution curve of the silica-alumina particle of the present invention, and FIG. 6 is a particle size distribution curve of the silica-alumina particles outside the scope of the present invention, shown in FIG. 6. From these FIGS. 5 and 6, it is understood that the additive of the present invention is characterized in that the secondary particle size is controlled to a very fine level such that the content of particles having a particle size smaller than 1 μm is at least 50% by weight, especially at least 70% by weight.

Since the alumina-silica particles of the present invention have the above-mentioned particulate structure and particle size characteristics, if the alumina-silica particles of the present invention are incorporated into a resin for the production of a thin film, the particles are finely dispersed in the resin very easily and the blocking resistance and slip property can be prominently improved without degradation of the transparency and continuity of the film.

Since the alumina-silica additive of the present invention is stabilized in the amorphous state though it has the above-mentioned fine particle size, the water absorption of the additive is controlled to a level much lower than that of the zeolite. Furthermore, the additive of the present invention has an exceptionally small BET specific surface area as the amorphous alumina-silica. Accordingly, when the additive of the present invention is incorporated, blowing by adsorbed water or adsorbed gas is completely prevented.

Chemical Composition and Other Characteristics of Additive

The alumina-silica resin additive of the present invention has a composition in which the $Al_2O_3/SiO_2$ molar ratio is from 1/1.8 to 1/5, especially from $\frac{1}{2}$ to $\frac{1}{4}$. If the $Al_2O_3/SiO_2$ molar ratio is outside the above-mentioned range, it is difficult to form alumina-silica into cubic or spherical particles having a certain particle size and the characteristics such as the slip property are inferior to those of the additive of the present invention.

In the alumina-silica additive of the present invention, the presence of a small amount of a basic component, especially an alkali metal component, in addition to the essential alumina and silica component is allowed. Incidentally, the content of the alkali metal component is lower than 50%, especially lower than 30%, of the alkali metal content in the zeolite in which the $Al_2O_3/SiO_2$ molar ratio is within the same range. Namely, it must be noted that the content of the basic component is extremely low in the additive of the present invention.

When this alumina-silica additive is heated at 550° C. for 3 hours and then allowed to stand still in an atmosphere maintained at a relative humidity of 75% and a temperature or 25° C. for 24 hours, the water absorption (moisture regain) is smaller than 10% by weight, especially smaller than 6% by weight. The additive may contain water in an amount exceeding this moisture regain, but it is generally preferred that the water content in the additive be lower than the water regain.

Several examples of the composition of the alumina-silica additive of the present invention suitable for attaining the objects of the present invention are as follows.

Type I
   $Al_2O_3$: 27 to 45% by weight
   $SiO_2$: 32 to 55% by weight
   $Na_2O$: 0.1 to 20% by weight
   $H_2O$: 0 to 25% by weight Type II
   $Al_2O_3$: 38 to 54% by weight
   $SiO_2$: 32 to 64% by weight
   $Na_2O$: 0.1 to 20% by weight
   $H_2O$: 0 to 30% by weight Type III
   $Al_2O_3$: 47 to 64% by weight
   $SiO_2$: 38 to 78% by weight
   $Na_2O$: 0.1 to 20% by weight
   $H_2O$: 0 to 30% by weight The additive of the present invention has the above-mentioned composition and is amorphous, and furthermore, it has chemical properties not possessed by zeolites. For example, an aqueous suspension of a zeolite having a solid content of 1% has generally a pH value higher than 10.5, while an aqueous suspension of the amorphous alumina-silica particles of the present invention have a pH value lower than 10.

A zeolite, for example, zeolite A, has an endothermic peak at a temperature of 780° to 920° C. in the differential thermal analysis and is converted to carnegieite at this peak temperature. On the other hand, the amorphous alumina-silica cubic particles of the present invention have an endothermic peak at a higher temperature, that is, 900° to 1000° C., and is converted to $Al_2SiO_5$ at this peak temperature.

Known amorphous alumina-silica has a specific surface area much larger than 100 m²/g. On the other hand, the alumina-silica cubic particles of the present invention have an extremely small specific surface area and the BET specific surface area is smaller than 80 m²/g, preferably smaller than 50 m²/g, especially preferably smaller than 30 m²/g.

Furthermore, the oil absorption of the amorphous alumina-silica particles of the present invention is generally 120 to 20 ml/100 g, especially 60 to 30 ml/100 g, as determined according to the method of JIS K-5101.

Preparation Process

In view of the easiness of synthesis, the easy availability and the treatment easiness, zeolite A, zeolite X and zeolite Y, recited in the order of importance, are used as the starting crystalline zeolite. It is important that the primary particle size of the starting zeolite should be smaller than 0.6 μm, especially 0.2 to 0.5 μm. The starting zeolite having such a fine primary particle size and being uniform in the particle size is a synthetic zeolite prepared from lamellar active silicic acid or lamellar active aluminosilicic acid obtained by acid-treating solid silicic acid, especially a smectite clay mineral such as acid clay, as disclosed in Japanese Patent Publication No. 51992/83 proposed by us. The synthetic zeolite of this type is characterized in that the zeolite can be rendered amorphous by the acid treatment even under mild conditions, for example, a higher pH value or a shorter reaction time.

The zeolite is formed into an aqueous slurry, and the slurry is subjected to the acid treatment. Either an inorganic acid or an organic acid can be used without any particular limitation. From the economical viewpoint, use of hydrochloric acid sulfuric acid, nitric acid, phosphoric acid and carbonic acid is preferred. The acid in the form of a dilute aqueous solution is used for the neutralization reaction of the crystalline zeolite.

When the acid is added to the aqueous slurry of the crystalline zeolite, the pH value is naturally shifted to the acidic side with addition of the acid. In the present invention, the acid treatment is carried out in such a manner that the above-mentioned two conditions are satisfied. In order to control abrupt and local reduction or the pH value, a medium having a ph-buffering property is used as the acid treatment medium. Namely, it is preferred that the acid treatment be carried out in the presence of an alkali metal salt in an amount of at least 1.0 mole %, especially at least 3.0 mole %, based on the acid in the medium. When sulfuric acid is used as the acid, sodium sulfate is preferred as the alkali metal salt, and when hydrochloric acid is used as the acid, it is preferred that sodium chloride be used as the alkali metal salt. Accordingly, a method in which an additional amount of the acid is supplied to the alkali metal salt-containing mother liquor prepared as the by-product in the acid treatment of the zeolite and the resulting acid-alkali metal salt solution is used for the subsequent treatment of the zeolite is advantageously adopted for the acid treatment of the zeolite.

It is important that the pH value of the medium at the acid treatment should not be lower than 5 even at the final stage.

The obtained amorphous alumina-silica is washed with water and is dried or calcined at a temperature higher than 300° C. according to need, whereby the intended product is obtained.

Of course, the surfaces of the particles are covered in advance with a metal soap, a resin acid metal soap or other dispersant according to known means.

Use

The alumina-silica resin additive is incorporated into various resins, for example, olefin resins such as polypropylene, polyethylene, a crystalline propylene/ethylene copolymer and an ion-crosslinked olefin copolymer, thermoplastic polyesters such as polyethylene terephthalate and polybutylene terephthalate, polyamides such as 6-nylon, 6,6-nylon and 6,8-nylon, chlorine-containing resins such as a vinyl chloride resin and a vinylidene chloride resin, polycarbonates, polysulfones, polyacetal resins and other thermoplastic resins and is effective for imparting a good slip property and a good blocking resistance to shaped articles of these resins. Furthermore, the resin additive of the present invention may be incorporated in a kneaded composition or liquid composition for forming a coating to impart a blocking resistance to the coating.

In this application, the amorphous alumina-silica cubic particles of the present invention are incorporated in an amount of 0.001 to 10 parts by weight, especially 0.01 to 3 parts by weight, per 100 parts by weight of the resin.

Filler

In the amorphous alumina-silica cubic particles of the present invention, the alkali component content is low, coloration or deterioration of the resin is not caused and the kneading property with the resin is good. Accordingly, the product of the present invention can be used as a filler for a resin.

When the amorphous alumina-silica cubic particles of the present invention are used as the filler, the surfaces of the particles are covered with an organic lubricant in an amount of 0.01 to 30% by weight, especially 1 to 10% by weight, based on the particles.

In this embodiment, a certain amount or the organic lubricant applied to the surfaces of the amorphous silica-alumina cubic particles maintains good bite of the particles into the resin at the kneading step and prominently reduces the abrasion at the step of mixing or kneading with the resin.

Generally, the lubricant is defined as an agent for improving the flowability of a thermoplastic resin at the heat-molding operation and facilitating the processing or the parting of a molded article from the mold. However, according to the present invention, the lubricant applied to the surfaces of the amorphous silica-alumina particles exerts the function of prominently reducing the abrasion of a mixing or kneading apparatus by the particles. This will become apparent from the examples given hereinafter.

In the case where the surfaces of filler particles are treated with a lubricant, when the filler is mixed with a resin, bite of the filler with the resin is generally degraded. The degree of bite is evaluated by supplying a composition comprising, for example, a vinyl chloride resin and the filler to a plastograph tester and measuring the time of initiation of rise of the torque from the point of initiation of kneading. In case of a filler having a good bite, this rising time is shorter and in case of a filler having an insufficient bite, the rising time is long. It is presumed that the lubricant on the surfaces of particles effectively acts for preventing the abrasion of a mixer or kneader but kneading with the resin is more greatly influenced by the shape of the particles.

In the present embodiment where the amorphous silica-alumina cubic particles are used as the filler, the organic lubricant present on the surfaces of the particles promotes uniform dispersion of the particles into the resin. The fact that dispersion of the additive is uniformly effected in respective individual particles can be confirmed by observing the obtained resin film by an electron microscope.

It is critical that the organic lubricant should be applied to the particle surfaces in an amount of 0.01 to 30% by weight, especially 1.0 to 10% by weight. If the amount of the organic lubricant is too small and below the above-mentioned range, no effect of preventing the abrasion is attained and if the amount of the lubricant is too large and exceeds the above-mentioned range, bite of the filler into the resin is degraded.

All of known organic lubricants can be used in the present invention. Preferred examples are aliphatic hydrocarbons such as liquid paraffin, industrial white mineral oil, synthetic paraffin, petroleum wax and odorless light hydrocarbon, silicones such as organopolysiloxane, fatty acids and metal salts thereof such as higher fatty acids having 8 to 22 carbon atoms, obtained from animal or vegetable oils and by hydrogenating these fatty acids, and alkali metal, alkaline earth metal, Zn and Al salts of these higher fatty acids, amides and amines such as higher fatty acid amides, e.g., oleyl palmitoamide, stearyl erucamide and 2-stearomidoethyl stearate, ethylene-bis-fatty acid amides, e.g., N,N'-oleyulstearyl ethylemediamine, N,N'-bis(2-hydroxyethyl)alkyl ($C_{12}$–$C_{18}$) amide, N,N'-bis(hydroxyethyl) lauroamide and oleic acid reacted with N-alkyl ($C_{10}$–$C_{18}$) trimethylenediamine and fatty acid diethanolamines, e.g., a distearic acid ester of di(hydroxyethyl)diethylenetriamine monoacetate, fatty acid esters of monohydric and polyhdyric alcohols such as n-butyl stearate, dibutyl (n-butyl) debacate, dioctyl (2-ethylhexyl and n-octyl) sebacate, glycerol fatty acid esters, pentaerythritol tetrastearate, polyethylene glycol fatty acid esters, polyethylene glycol distearate, polyethylene glycol dilaurate, polyethylene glycol dioleate, polyethylene glycol coconut oil fatty acid diester, polyethylene glycol tall oil fatty acid diester, ethanol-diol montanic acid ester, 1,3-butane-diol montanic acid diesters, diethylene glycol stearic acid diester and propylene glycol fatty acid diesters, triglycerides and waxes such as hydrogenated edible oil and fat, cotton seed oil, other edible oils, linseed oil, palm oil, a glycerol ester of 12-hydroxystearic acid, hydrogenated fish oil, beef tallow, spermaceti wax, montan wax, carnauba wax, bees wax, wood wax, monohydric fatty alcohol-aliphatic saturated acid esters, e.g., hardened whale oil lauryl stearate and stearyl stearate, and other lubricants such as propylene glycol alginate and dialkylketones.

In the present invention, a lubricant containing a polar group such as a carboxylic acid, a carboxylic anhydride, a carboxylic acid salt, a carboxylic acid ester, a carboxylic acid amide, a ketone, an ether or a hydroxyl group at a concentration of 0.5 to 20 millimoles, especially 1 to 10 millimoles, per gram of the lubricant and having at least one long-chain alkyl group having at least 10 carbon atoms, esepcially 12 to 18 carbon atoms, is preferably used among the foregoing lubricants. Such preferred lubricants are easily available as fatty acid, fatty acid derivatives, alipahtic alcohols and aliphatic alcohol derivatives. In view of the above-mentioned function, a fatty acid amide type lubricant is preferred.

In view of the easiness of handling at the surface treatment, that is, the flowability or caking resistance as the powder, it is preferred that the melting point of the lubricant be higher than 30° C., especially 50° to 150° C. The lubricant satisfying this requirement is an ethylene-bis-fatty acid amide such as ethylene-bis-stearic acid amide.

The surface treatment of the amorphous silica-alumina cubic particles with the organic lubricant is accomplished by mixing the cubic particles with 0.01 to 30% by weight, especially 1 to 10% by weight, of the organic lubricant.

The organic lubricant may be applied to the surfaces of the cubic particles directly or in the form of a solution or dispersion.

It is preferred that mixing be carried out by using an attrition type mixer such as a Henschel mixer or a super mixer. By using such a mixer, the respective particles are uniformly surface-treated with the lubricant.

The alumina-silica resin additive of the present invention is excellent in the dispersibility in a resin, the non-blowing property, the slip characteristic arid the anti-blocking property.

The present invention will now be described in detail with reference to the following examples that by no means limit the scope of the present invention.

EXAMPLE 1

The zeolite used in this example was zeolite 4A synthesized according to the following method.

A finely divided silicic acid gel obtained by acid-treating an acid clay produced at Nakajo, Niigata, Japan, which is a smectite clay mineral, was selected and used as the silicic acid component.

This acid clay contained 45% by weight of water in the as-obtained state, and the contents of the main components based on the dry product (dried at 110° C.) were 72.1% by weight of $SiO_2$, 14.2% by weight of $Al_2O_3$, 3.87% by weight of $Fe_2O_3$, 3.25% by weight of MgO and 1.06% by weight of CaO. The ignition loss was 3.15% by weight. The starting acid clay was molded into columns having a diameter of 5 mm and a length of 5 to 20 mm. The columns in an amount corresponding to 765 g as the dry product were charged in a conical beaker having a capacity of 5 liters, and 2 l of an aqueous solution or sulfuric acid having a concentration of 50% by weight was added. The mixture was acid-treated in the granular state at 90° C. for 7 hours. The sulfates of the basic components, formed by reaction with sulfuric acid, were washed away and removed by decantation using a dilute solution of sulfuric acid and water. The residue was washed with water until the sulfate radical was not detected, whereby a granular acid-treated product of the acid clay was obtained.

In order to attain a particle size distribution suitable for the synthesis of the zeolite in the acid-treated granular product, a household mixer (Hitachi Mixer Model VA-853 supplied by Hitachi Seisakusho) was charged with the acid-treated granular product and water was added so that the solid content was 20% by weight. The mixture was stirred for 20 minutes to effect pulverization, and the mixture was classified by a 200-mesh net and pulverized by a ball mill having a capacity of 7 liters for 3 hours to obtain a slurry or a particle size-adjusted acid-treated clay.

The particle size distribution (%) was determined. The obtained results are shown in Table 1.

TABLE 1

| Particle Size (μm) | Content (% by weight) |
|---|---|
| 0 to 1 | 49.3 |
| 1 to 2 | 37.3 |
| 2 to 3 | 13.0 |
| above 3 | 0.4 |

The results of the chemical analysis (% by weight based on the product dried at 110° C.) of the obtained acid-treated clay were as follows.

Ignition loss: 3.93
$SiO_2$: 94.19
$Al_2O_3$: 1.05
$Fe_2O_3$: 0.15
CaO: 0.49
MgO: 0.10

The following oxide molar ratios were chosen for the production of the zeolite.

$Na_2O/SiO = 1.2$
$SiO/Al_2O_3 = 2.0$
$H_2O/Na_2O = 35$

For attaining the above-mentioned molar ratios, the alumina component in an amount to be additionally added, the alkali component to be reacted with the alumina component and water necessary for the reaction were added to the acid-treated clay mineral by using a commercially available solution of an alkali metal aluminate ($Na_2O = 21.0\%$, $Al_2O_3 = 18.8\%$), commercially available caustic soda (NAOH) and water, mixing them, purifying the liquid mixture and supplying the refined liquid mixture to the slurry of the acid-treated clay in a stainless steel vessel having a capacity of 10 liters. Namely, the refined liquid mixture was mixed with the slurry under stirring at 70° C. so that the total amount of the reaction liquid was about 7 l. The mixture temporarily passed through a gel state and was formed into a homogeneous slurry. Then, the slurry was heated at 95° C. and stirred for 3 hours, whereby crystal particles of an alkali metal silicate (zeolite) were obtained. After formation of the crystals, aging was conducted at the same temperature for 2 hours. The reaction mixture was separated into a crystal-containing reaction product and a mother liquor by filtration. The filter cake was recovered and one part by weight as the dry product of the filter cake of the reaction product was mixed with 4 parts by weight of deionized water, and the mixture was stirred to obtain a homogeneous slurry. The mother liquor was separated by conducting filtration again. The pH value of the filtrate was 12.5. The primary particle size determined by a scanning type electron microscope was about 0.5 μm.

Then, 1000 g (515 g as the anhydrous product) or the filter cake of Zeolite 4A was dispersed in 5 l or dilute sulfuric ac the pH value adjusted to 2, and the dispersion and the above-mentioned dilute sulfuric acid were simultaneously poured into a 200-liter vessel equipped with a high-speed stirrer. The amount used of the dilute sulfuric acid was 172 l and the pH value at the time of completion of pouring was 5.8. Then, the mixture was heated at 50° C. and maintained at this temperature for 1 hour, and the mixture was filtered, washed with water, dried, calcined at 350° C. for 2 hours and pulverized by an atomizer to obtain an amorphous aluminosilicate. The physical properties of the obtained aluminosilicate are shown in Table 2.

Incidentally, the physical properties were determined according to the following methods.

(1) Pack Density

The peak density was determined according to the method of JIS K-6220.

(2) Specific Surface Area

The sample was dried at 150° C. until the weight was not changed any more, and 0.5 to 0.6 g of the dried sample was charged in a weighing bottle, dried in a thermostat drier maintained at 150° C. for 1 hour and immediately weighed precisely. The sample was charged in an absorption test tube (2 to 5 ml) and was heated at 200° C., and evacuation was effected so that the vacuum degree in the adsorption test tube became $10^{-4}$ mmhg. The test tube was naturally cooled and placed in liquid nitrogen at about $-196°$ C. and the amount adsorbed of $N_2$ gas was measured at 4 to 5 points in the range where the $PN_2/Po$ ratio ($PN_2$ stands for the nitrogen gas pressure and Po stands for the atmospheric pressure at the measurement) was from 0.05 to 0.30. The amount adsorbed of nitrogen gas, from which the dead volume was subtracted, was covnerted to the amount adsorbed at 0° C. under 1 atmosphere. The obtained value was substituted in the equation of BET to obtain Vm (ml/g) (the amount of adsorbed nitrogen gas necessary for formation of a monomolecular layer on the surface of the sample).

The specific surface area S was calculated according to the following formula:

$$S = 4.35 \times Vm \ (m^2/g)$$

(3) Oil Absorption

The oil absorption was determined according to the method of JIS K-5101.

(4) Whiteness

The whiteness was determined according to the method of JIS P-8101.

(5) Particle Size by Electron Microscope

An appropriate amount of a fine powder sample was placed on a metal sample plate and was sufficiently dispersed thereon, and a metal was coated by using a metal coating device (ion sputtering apparatus Model E-101 supplied by Hitachi Seisakusho) to obtain a sample to be photographed. According to the customary procedures, four electron microscope images of 10,000 magnifications were obtained while changing the visual field by using a scanning electron microscope (Model S-570 supplied by Hitachi Seisakusho). Typical 6 particles were selected from cubic particle images in the visual field and the length of one side of each cubic particle image was measured by using a scale and this length was designated as the primary particle size in the instant specification.

(6) Crystallinity by X-Ray Diffractometry

The sample was passed through a 200-mesh standard sieve and dried in an electric thermostat drier at 105° C. for 3 hours together with a standard sample (standard sample of zeolite Na-A supplied by UCC). Then, the sample was naturally cooled in a dessicator, and the X-ray diffraction was measured and the crystallinity was calculated according to the following equation:

Crystallinity of Zeolite Na-A $$= \left( \frac{\sum \text{peak heights of sample at 21.7°, 24.0°, 27.2° and 300°}}{\sum \text{peak heights of standard sample at 21.7°, 24.0°, 27.2° and 300°}} \right) \times 100$$

Apparatus

X-ray diffraction apparatus including goniometer PCG-S2 and rate meter ECP-D2 (supplied by Rigaku Denki), Measurement Conditions:
   Target: Cu
   Filter: Ni
   Voltage: 35 KV
   Ampere: 20 mA
   Count full scale: $4 \times 10^3$ C/S
   Time constant: 1 sec
   Chart speed: 1 cm/min
   Scanning speed: 1°/min
   Diffraction angle: 1°
   Slit width: 0.15 mm
   Measurement range: $2\theta = 20°$ to 32

(7) Particle Size Distribution

The measurement was carried out by using Micron Photosizer Model SKN-1000 supplied by Seishin Kogyo. An aqueous solution of sodium pyrophosphate having a concentration of 0.2% was used as the dispersion medium. Before the measurement, the adjustment of the zero point of a recorder and the adjustment of the shaking width were carried out. The light transmission of the blank was set at Log 1.95.

The sample dispersion was carried out in the following manner. Namely, 100 ml of the dispersion medium was charged in a 200-ml beaker and about 15 mg of the sample was added to the dispersion medium. The mixture was dispersed for about 2 minutes by an ultrasonic disperser (SK Disperser). The mixture was sometimes stirred by a stirrer during the dispersing operation. Then, the dispersion was heated or cooled to a predetermined liquid temperature. The dispersion was charged in a glass cell to a marked line. The cell was set at a cell holder and a light source lamp was lighted. When a pen of the recorder was located between Log 1.3 and Log 1.4, it was judged that the concentration of the dispersion was appropriate. If the position of the pen was smaller than Log 1.3, the concentration was too high, and if the position of the pen was larger than Log 1.4, the concentration was too low. Accordingly, the dispersion was prepared again in such cases. The measurement was conducted under such conditions that the maximum particle size was 30 μm.

EXAMPLE 2

In 2 l of dilute sulfuric acid having the pH value adjusted to 2 was dispersed 200 g (103 g in the anhydrous state) of the same filter cake of zeolite 4A as prepared in Example 1, and the dispersion was vacuum-filtered by a Buchner funnel. 2 l of dilute sulfuric acid having a pH value of 3 was added during the filtration before the exposure of the filter cake, and then, 5 l or industrial water (pH=5.8) was added to complete the filtration. The post treatment was carried out in the same manner as described in Example 1. The physical properties of the obtained product are shown in Table 2.

EXAMPLE 3

In a buffer solution (comprising 250 ml of 1M sodium acetate, 75 ml of 1N hydrochloric acid and 1000 ml of water and having a pH value of 4.9) was poured 100 g (51.5 g in the anhydrous state) of the same filter cake of zeolite 4A as prepared in Example 1 with stirring, and the temperature was elevated to 50° C. and the mixture was maintained at this temperature for 3 hours. At this point, the pH value was 5.6. The post treatment was carried out in the same manner as described in Example 1 except that the calcination temperature was changed to 500° C. The physical properties of the obtained product are shown in Table 2.

about 0.8 μm) and (3) a commercially available zeolite for a detergent (the primary particle size was about 0.2 μm) were used as the zeolite. To 500 ml of a 3% zeolite slurry was dropped 0.5N hydrochloric acid at room temperature with stirring by means of a buret so that the pH value was adjusted to 4 over a period of about 30 minutes. Then, at an interval of 1 hour, the pH adjustment was carried out by 0.5N hydrochloric acid so that the pH value in the stable state was about 4. The reaction was conducted in this state for 10 hours as a whole. The slurry was filtered, washed with water and dried to obtain an amorphous aluminosilicate. The physical properties of the obtained products are shown in Table 3.

TABLE 2

|  | Base Zeolite | Example 1 | Example 2 | Example 3 |
|---|---|---|---|---|
| Specific Surface Area (m²/g) | — | 29 | 30 | 21 |
| pH (1% suspension) | 12.0 | 7.9 | 8.9 | 8.5 |
| Primary Particle Size (μm) by Electron Microscope | about 0.5 | about 0.5 | about 0.5 | about 0.5 |
| Appearance by Electron Microscope | beautiful cubic or spherical shape | beautiful cubic or spherical shape | beautiful cubic or spherical shape | beautiful cubic or spherical shape |
| Crystallinity by X-Ray Diffractometry | 98 | amorphous | amorphous | amorphous (slight peaks) |
| Partical Size Distribution (%) | | | | |
| 0–0.5 μm | 52.0 | 40.6 | 41.3 | 52.9 |
| 0.5–1.0 μm | 35.1 | 34.5 | 35.1 | 27.5 |
| 1.0–2.0 μm | 11.7 | 16.1 | 17.3 | 17.9 |
| 2.0–3.0 μm | 1.1 | 7.3 | 6.1 | 1.6 |
| 3.0–5.0 μm | 0.1 | 1.5 | 0.2 | 0.1 |
| Moisture Absorption (% by weight) at Relative Humidity of 75% | 22.8 | 4.7 | 3.4 | 3.1 |
| Chemical Composition (%) | | | | |
| Ignition loss | 13.13 | 4.70 | 5.14 | 2.45 |
| $SiO_2$ | 37.59 | 50.08 | 48.33 | 51.13 |
| $Al_2O_3$ | 31.51 | 41.51 | 40.46 | 42.49 |
| $Na_2O$ | 17.31 | 3.40 | 5.37 | 3.71 |
| Total | 99.54 | 99.69 | 99.30 | 99.78 |
| $SiO_2/Al_2O_3$ | 2.03 | 2.05 | 2.03 | 2.05 |

COMPARATIVE EXAMPLE 1

Three zeolites differing in the primary particle size were acid-treated. Namely, (1) the same zeolite as used in Example 1 (the primary particle size was about 0.5 μm), (2) a zeolite for a detergent (Silton B supplied by Mizusawa Kagaku Kogyo; the primary particle size was From the results shown in Table 3, it is seen that each product could not be used for attaining the objects of the present invention because the content or particles having a particle size smaller than 1 μm was much lower than in the products obtained in Examples 1 through 3.

TABLE 3

|  | Comparative Example 1-(1)-1 | Comparative Example 1-(1)-2 | Comparative Example 1-(2) | Comparative Example 1-(3) |
|---|---|---|---|---|
| Primary Particle Size (μm) of Starting Zeolite | about 0.5 | about 0.5 | about 0.8 | about 2.0 |
| pH Value of Slurry in Stable State | 5.11 | 4.03 | 4.51 | 4.02 |
| Crystallinity by X-Ray Diffractometry | amorphous | amorphous | amorphous | amorphous (slight peaks) |
| Appearance by Electron Microscope | agglomeration of cubes | cubic shape considerably marred, and gelatinous substance formed with violent agglomeration | agglomeration of cubes | slight agglomeration of cubes |
| Particle Size Distribution (%) | | | | |
| 0–1 μm | 12.9 | 4.1 | 5.2 | 0.2 |
| 1–2 μm | 29.7 | 8.8 | 7.9 | 3.5 |
| 2–4 μm | 19.7 | 33.8 | 28.8 | 36.4 |
| 4–6 μm | 30.3 | 30.0 | 26.5 | 29.5 |
| 6–10 μm | 3.5 | 19.1 | 20.3 | 16.9 |
| 10–15 μm | 3.7 | 3.2 | 7.6 | 9.3 |
| 15–20 μm | 0.2 | 1.0 | 3.3 | 3.2 |
| 20–30 μm | — | — | 0.4 | 0.8 |
| 30–40 μm | — | — | — | 0.2 |

EXAMPLE 4

A predetermined amount, shown in Table 4, of calcium stearate (SC supplied by Nippon Yushi), ethylene-bis-stearic acid amide (KAO-WAX EB-F supplied by Kao Soap) or polyethylene glycol (PEG 4,000 supplied by Nippon Yushi) was added to 2 kg of the amorphous aluminosilicate obtained in Example 1, and the mixture was stirred by a super mixer (Type VNM 5AL supplied by Nippon Spindle) for 30 to 40 minutes to effect the surface treatment. The abrasive property of the surface-treated aluminosilicate was tested in the following manner.

Circular vanes (having the same configuration) having a thickness of 1 to 1.5 mm and a diameter of 5 to 6 cm (the weight was 20 to 35 g) were prepared from a lead plate, a copper plate, an iron plate and a stainless steel plate, which differed in the Mohs hardness and they were attached to a homogenizing mixer (Homo Mixer supplied by Tokushu Kika Kogyo) and the mixer was immersed in a fixed ointment bottle having a capacity of 1 l, 70% of which was filled with the sample powder. Each vane was rotated at 4000 rpm for 2 hours, and the abrasive property was evaluated based on the weight decrease ratio. The obtained results are shown in Table 4.

Rotation number of rotor: 40 rpm
Amount of resin composition: 61 g
The obtained results are shown in Table 5.

TABLE 5

| Sample No. | Amount Added (PHR) | G.T. (min) | M.T. (kg-m) |
|---|---|---|---|
| Comparative Example 2 | 0 | 3.8 | 2.80 |
| Example 1 (untreated) | 1 | 2.8 | 2.70 |
| Example 4-2 | 1 | 2.6 | 2.65 |
| Example 4-3 | 1 | 2.5 | 2.60 |
| Example 4-4 | 1 | 2.3 | 2.60 |

Note
G.T.: time (minutes) required for attaining maximum torque
M.T.: maximum torque (kg-m)

EXAMPLE 6

The surface-treated sample obtained in Example 4 was melt-kneaded in an amount shown in Table 6 at 190° C. into low density polyethylene having a melt flow index of 2.0 g/10 min and a density of 0.925 g/ml by an extruder and the kneaded mixture was pelletized.

Pellets were similarly prepared by using synthetic silica (Comparative Example 4) or calcium carbonate (Comparative Example 5) as the inorganic additive or without adding any inorganic additive (Comparative Example 3).

TABLE 4

| | Example 1 | Example 4-1 | Example 4-2 | Example 4-3 | Example 4-4 |
|---|---|---|---|---|---|
| Treatment Conditions | | | | | |
| lubricant | not added | calcium stearate | calcium stearate | calcium stearate | calcium stearate |
| amount (% by weight) | — | 0.2 | 2.0 | 10.0 | 20.0 |
| rotation number (rpm) | — | 0.2 | 2.0 | 10.0 | 20.0 |
| treatment temperature (°C.) | — | 150 | 2.0 | 10.0 | 20.0 |
| Abrasion Ratio (%) | | | | | |
| lead plate (1.5) | 0.081 | 0.042 | 0.041 | 0.007 | 0.003 |
| copper plate (3.0) | 0.052 | 0.018 | 0.000 | 0.001 | 0.001 |
| iron plate (4.5) | 0.028 | 0.006 | 0.002 | 0.000 | 0.001 |
| stainless steel plate (6.5) | 0.019 | 0.008 | 0.000 | 0.000 | 0.000 |

| | Example 4-5 | Example 4-6 | Example 4-7 | Example 4-8 | Example 4-9 | Example 4-10 |
|---|---|---|---|---|---|---|
| Treatment Conditions | | | | | | |
| lubricant | polyethylene glycol | polyethylene glycol | polyethylene glycol | ethylene-bis-stearic acid amdie | ethylene-bis-stearic acid amdie | ethylene-bis-stearic acid amdie |
| amount (% by weight) | 0.2 | 2.0 | 10.0 | 0.2 | 2.0 | 10.0 |
| rotation number (rpm) | 0.2 | 2.0 | 10.0 | 0.2 | 2.0 | 10.0 |
| treatment temperature (°C.) | 80 | 2.0 | 10.0 | 150 | 2.0 | 10.0 |
| Abrasion Ratio (%) | | | | | | |
| lead plate (1.5) | 0.051 | 0.043 | 0.010 | 0.031 | 0.030 | 0.002 |
| copper plate (3.0) | 0.023 | 0.020 | 0.003 | 0.016 | 0.002 | 0.000 |
| iron plate (4.5) | 0.010 | 0.006 | 0.000 | 0.005 | 0.000 | 0.001 |
| stainless steel plate (6.5) | 0.008 | 0.002 | 0.000 | 0.006 | 0.000 | 0.000 |

Note
Each parenthesis value indicates the Mohs hardness.

EXAMPLE 5

The sample surface-untreated in Example 1 or the sample surface-treated in Example 4 was incorporated in a vinyl chloride resin and the lubrication test was carried out by using a plastograph. The sample test was carried out without adding any inorganic additive (Comparative Example 2).

Resin Composition
　　Vinyl chloride resin (Geon EP-103): 100 parts by weight
　　Dibasic lead sulfate: 0.5 part by weight
　　Lead stearate: 1.0 part by weight
　　Sample: 1.0 part by weight
Plastograph Conditions
　　Oil trap: 200° C.

Each pellet was supplied to an extruder and was extruded in the tubular form at 180° C. from a die, and the extrudate was formed into a film having a thickness of 30 μm. With respect to each film, the haze, the blocking property, the slip characteristic and the scratching property were determined according to the methods described below.

The obtained results are shown in Table 6.

(1) Haze

The haze was determined according to the method of ASTM D-1003.

(2) Blocking Property

Two films were piled and allowed to stand still under a load of 20 kg in an oven maintained at 40° C. for 24 hours. The force necessary for pealing the films were measured and this force was designated as the blocking property.

(3) Slip Characteristic

The slip characteritic was determined according to the method of ASTM D-1894.

(4) Scratching Property

Two films were piled, and they were rubbed by the finger and the scratching property was evaluated according to the following scale.

⊙: not scratched
○: slightly scratched
Δ: somewhat scratched
X: considerably scratched

TABLE 6

| Sample No | Amount Added (part by weight) | Haze (%) | Blocking Property (Kg/10 cm$^2$) | Slip Characteristic | Scratching Property |
|---|---|---|---|---|---|
| Example 1 | 0.15 | 3.9 | 0.37 | 0.16 | Δ |
| Example 4-2 | 0.05 | 3.2 | 0.38 | 0.08 | ○ |
| Example 4-2 | 0.15 | 3.6 | 0.37 | 0.15 | ⊙ |
| Example 4-2 | 0.25 | 3.7 | 0.36 | 0.13 | ⊙ |
| Example 4-3 | 0.15 | 3.5 | 0.37 | 0.15 | ⊙ |
| Example 4-6 | 0.15 | 3.5 | 0.37 | 0.15 | ⊙ |
| Example 4-9 | 0.15 | 3.7 | 0.36 | 0.15 | ⊙ |
| Comparative Example 3 | 0 | 2.3 | 3.90 | — | Δ |
| Comparative Example 4 | 0.15 | 4.6 | 0.41 | 0.28 | Δ |
| Comparative Example 5 | 0.15 | 5.2 | 0.46 | 0.35 | X |

We claim:

1. A process for the preparation of an alumina-silica resin additive, which comprises preparing an aqueous slurry of a synthetic zeolite consisting of fine cubic particles having an Al$_2$O$_3$/SiO$_2$ molar ratio of from 1/1.8 to 1/5.0 and an average primary particle size smaller than 0.6 μm, contacting the synthetic zeolite in the aqueous slurry with an acid in an aqueous medium containing an acid and a water-soluble alkali metal salt in an amount of at least 1.0 mole % based on the acid under such a buffer condition that local reduction of the pH value is avoided and under such a condition that the final pH value is not lower than 5, thereby to effect an acid treatment of the synthetic zeolite, and calcining the acid-treated zeolite at a temperature higher than 300° C.

2. A process according to claim 1 wherein the average primary particle size of the synthetic zeolite is from 0.2 to 0.6 μm.

3. A process according to claim 1 wherein the synthetic zeolite has an average particle size of from 0.2 to 0.5 μm.

4. A process according to claim 1 wherein the synthetic zeolite has an Al$_2$O$_3$/SiO$_2$ molar ratio of from ½ to ¼.

5. A process according to claim 1 wherein the synthetic zeolite is zeolite A, zeolite X or zeolite Y.

6. A process according to claim 1 wherein the alkali metal salt is used in an amount of at least 3.0 mole % based on the acid.

7. A process according to claim 1 wherein the acid is sulfuric acid and the alkali metal salt is sodium sulfate.

8. A process according to claim 1 wherein the acid is hydrochloric acid and the alkali metal salt is sodium chloride.

9. An alumina-silica resin additive consisting of amorphous particles having an Al$_2$O$_3$/SiO$_2$ molar ratio of from 1/1.8 to 1/5.0 wherein the alumina-silica particles have a definite cubic or spherical primary particle shape and an average primary particle size of from 0.2 to 0.6 μm as determined by the electron microscope method, the alumina-silica particles have such a secondary particle size distribution that the content of particles having a particle size smaller than 1 μm as determined by the weight precipitation method is at least 70% by weight, said alumina-silica particles have a BET specific surface area smaller than 80 m$^2$/g, and when the alumina-silica particles are heated at 550° C. for 3 hours and then allowed to stand still in an atmosphere maintained at a relative humidity of 75% and a temperature of 25° C. for 24 hours, the water absorption is smaller than 10% by weight, said amorphous particles being obtained by preparing an aqueous slurry of a synthetic zeolite consisting of fine cubic particles having an Al$_2$O$_3$/SiO$_2$ molar ratio of from 1/1.8 to 1/5.0 and an average primary particle size smaller than 0.6 μm, contacting the synthetic zeolite inn the aqueous slurry with an acid in an aqueous medium containing an acid and a water-soluble alkali metal salt in an amount of at least 1.0 mole % based on the acid under such a buffer condition that local reduction of the pH value is avoided and under such a condition that the final pH value is not lower than 5, thereby to effect an acid treatment of the synthetic zeolite, and calcining the acid-treated zeolite at a temperature higher than 300° C.

* * * * *